US009668073B2

United States Patent
Das et al.

(10) Patent No.: US 9,668,073 B2
(45) Date of Patent: May 30, 2017

(54) SYSTEM AND METHOD FOR AUDIO SCENE UNDERSTANDING OF PHYSICAL OBJECT SOUND SOURCES

(71) Applicant: Robert Bosch GmbH, Stuttgart (DE)

(72) Inventors: Samarjit Das, Sewickley, PA (US); Joao P. Sousa, Pittsburgh, PA (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/877,680

(22) Filed: Oct. 7, 2015

(65) Prior Publication Data

US 2017/0105080 A1 Apr. 13, 2017

(51) Int. Cl.
*H04R 29/00* (2006.01)
*G10L 15/06* (2013.01)

(52) U.S. Cl.
CPC ............ *H04R 29/00* (2013.01); *G10L 15/063* (2013.01); *H04R 29/004* (2013.01)

(58) Field of Classification Search
CPC ....... H04R 29/00; G10L 15/063; G10L 17/26; G10L 15/02
See application file for complete search history.

(56) References Cited

U.S. PATENT DOCUMENTS

| | | | |
|---|---|---|---|
| 2007/0183604 A1 | 8/2007 | Araki et al. | |
| 2016/0150338 A1* | 5/2016 | Kim | ........................ G08B 1/08 381/58 |

OTHER PUBLICATIONS

International Search Report and Written Opinion corresponding to PCT Application No. PCT/US2015/060148, mailed May 4, 2016 (16 pages).
Heittola, Toni et al., "Context-dependent sound event detection", EURASIP Journal on Audio, Speech, and Music Processing, vol. 2013, No. 1, Jan. 1, 2013 (13 pages).
Lu, Tong et al., "Context-based environmental audio event recognition for scene understanding", Multimedia Systems, vol. 21, No. 5, Oct. 9, 2014 (18 pages).
Alkilani, Amjad et al., "Acoustic Events Semantic Detection, Classification, and Annotation for Persistent Surveillance Applications", Signal Processing, Sensor/Information Fusion, and Target Recognition XXIII, vol. 9091, 909119, 2014 (12 pages).
Neumann, Joachim et al., "Integration of audiovisual sensors and technologies in a smart room", Apr. 2007, (9 pages).

* cited by examiner

*Primary Examiner* — Andrew L Sniezek
(74) *Attorney, Agent, or Firm* — Maginot Moore & Beck LLP

(57) ABSTRACT

A method of operating an audio monitoring system includes generating with a sound sensor audio data corresponding to a sound event generated by an object in a scene around the sound sensor, identifying with a processor a type and action of the object in the scene that generated the sound with reference to the audio data, generating with the processor a timestamp corresponding to a time of the detection of the sound event, and updating a scene state model corresponding to sound events generated by a plurality of objects in the scene with reference to the identified type of object, action taken by the object, and the timestamp. The method further includes identifying a sound event in the scene with reference to the scene state model and a predetermined scene grammar stored in a memory, and generating with the processor an output corresponding to the sound event.

20 Claims, 11 Drawing Sheets

SYSTEM AND METHOD FOR AUDIO SCENE UNDERSTANDING OF PHYSICAL OBJECT SOUND SOURCES

FIELD

This disclosure relates generally to the field of digital sound processing and, more specifically, to systems and methods for performing audio monitoring of a scene.

BACKGROUND

State of the art human computer interaction (HCI) systems include a wide range of input systems that focus upon human speech recognition to enable human users to interact with computerized systems. However, in some environments a computing system receives input from non-human users. For example, the so-called "Internet of Things" (IoT) provides computing and networking services to a wide range of objects that interact with each other in different environments. One use of the IoT is to monitor the activity of users within an environment and the status of multiple objects in the environment, such as appliances in a kitchen or power tools used in a workshop. One drawback to traditional IoT implementations is that they require a large number of "smart" devices where each "smart" device is a computing device that typically incorporates one or more sensors incorporated into an appliance, power tool, or other device to monitor the operation of the device and communicate with other smart devices. Many objects that do not fit the definition of a "smart" device are regularly used in different environments, however. Additionally, even environments that include smart devices may require additional monitoring of events that occur in the environment outside of the traditional sensing and communication capabilities of the smart devices.

One solution to monitor environments includes deployment of different sensors in the environment, such as audio and video sensors. Of course, closed-circuit camera systems are often used for security monitoring, but intrusive video monitoring is often undesirable in many situations such as in private homes. Monitoring sounds in an environment to identify different events that occur in the environment can be less intrusive than video monitoring. However, prior art audio monitoring systems focus on detection of very narrow classes of actions for only a single object in an environment. For example, many alarm systems use glass break sensors that are specifically configured to detect the event of glass breaking, and each glass break sensor often monitors only a single window. The existing systems are not capable of identifying more complex events that include the interaction of multiple objects in an environment and that may occur over prolonged time periods. Consequently, improvements to audio monitoring systems for analysis of events based on sounds from multiple non-human physical objects would be beneficial.

SUMMARY

In one embodiment, a method of training an audio monitoring system has been developed. The method includes receiving with a processor in the audio monitoring system first registration information for a first object in a first scene around a sound sensor in the audio monitoring system, training with the processor a first classifier for a first predetermined action of the first object in the first scene, the first predetermined action generating sound detected by the sound sensor, receiving with the processor second registration information for a second object in the first scene around the sound sensor, training with the processor a second classifier for a second predetermined action of the second object in the first scene, the second predetermined action generating sound detected by the sound sensor, receiving with the processor object relationship data corresponding to a relationship between the first object and the second object in the first scene, generating with the processor a specific scene grammar including a first sound event formed from with reference to a predetermined general scene grammar stored in the memory, the first registration information, the second registration information, and the object relationship data, and storing with the processor the specific scene grammar in the memory in association with the first classifier and the second classifier for identification of a subsequent occurrence of the first sound event including the first predetermined action of the first object and the second predetermined action of the second object.

In another embodiment, a method of operating an audio monitoring system has been developed. The method includes generating with a sound sensor audio data corresponding to sound produced by an action performed by an object in a first scene around the sound sensor, identifying with a processor a type of object in the first scene that generated the sound with reference to the audio data, identifying with the processor the action taken by the object to generate the sound event with reference to the audio data, generating with the processor a timestamp corresponding to a time of the detection of the sound, updating with the processor a scene state model corresponding to a plurality of sound events generated by a plurality of objects in the first scene around the sound sensor with reference to the identified type of object, action taken by the object, and the timestamp, identifying with the processor one sound event in the plurality of sound events for the first scene with reference to the first scene state model and a predetermined scene grammar stored in a memory, and generating with the processor an output corresponding to the one sound event.

In another embodiment, an audio monitoring system has been developed. The system includes a sound sensor configured to generate audio data corresponding to sound produced by an action performed by an object in a first scene around the sound sensor, an output device, and a processor operatively connected to the sound sensor, the output device, and a memory. The processor is configured to identifying a type of object in the first scene that generated the sound with reference to the audio data, identify the action taken by the object to generate the sound event with reference to the audio data, generate a timestamp corresponding to a time of the detection of the sound, update a scene state model corresponding to a plurality of sound events generated by a plurality of objects in the first scene around the sound sensor with reference to the identified type of object, action taken by the object, and the timestamp, identify one sound event in the plurality of sound events for the first scene with reference to the first scene state model and a predetermined scene grammar stored in a memory, and generate an output corresponding to the one sound event.

DETAILED DESCRIPTION

Figure 1:
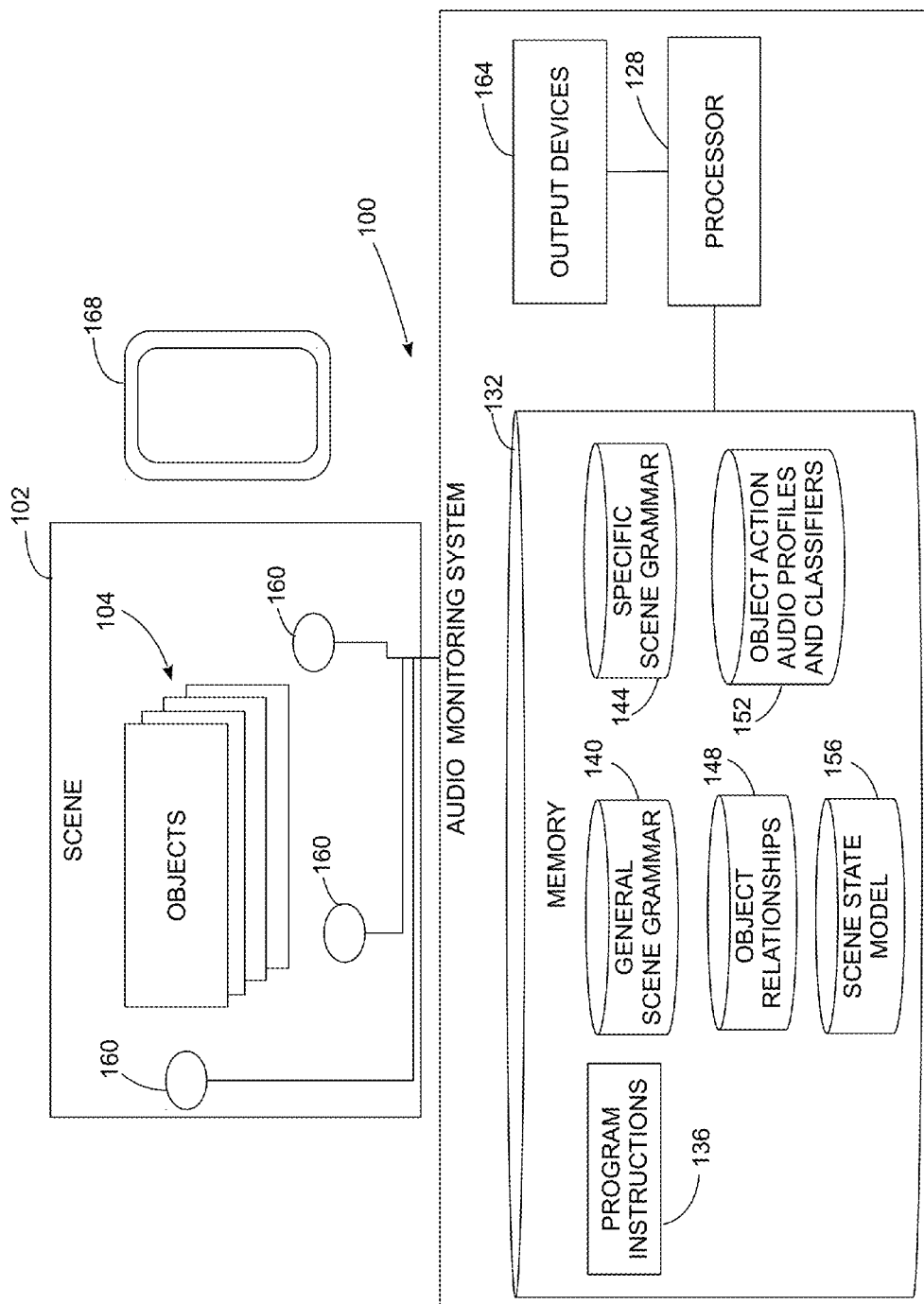
FIG. 1 is a schematic diagram of an audio monitoring system that identifies sound events produced by multiple objects in a scene around the audio monitoring system.

For the purposes of promoting an understanding of the principles of the embodiments disclosed herein, reference is now be made to the drawings and descriptions in the following written specification. No limitation to the scope of the subject matter is intended by the references. The present disclosure also includes any alterations and modifications to the illustrated embodiments and includes further applications of the principles of the disclosed embodiments as would normally occur to one skilled in the art to which this disclosure pertains.

As used herein, the term "scene" refers to a distinct physical environment that surrounds one or more sound sensors in an audio monitoring system. A scene includes one or more related objects that produce sounds, which are recorded by the sound sensors. Examples of a scene include a room within a house, a garage in a vehicle repair shop, a room in an industrial facility, and any other suitable physical environment around audio monitoring devices. In some embodiments, scenes are organized hierarchically with larger scenes including multiple smaller sub-scenes. For example, a house is considered as a larger scene that further includes scenes corresponding to individual rooms within the house (e.g. kitchen, living rooms, bathrooms, bedrooms).

As used herein, the term "object" refers to any physical item that performs actions producing recordable sounds within a scene. Common examples of objects within a residential kitchen scene include conventional and microwave ovens, sinks, garbage disposals, blenders. As described below, an audio monitoring system receives sequences of sounds generated by two or more objects and identifies sound events based on sounds from individual objects and based on relationships between different objects and the larger scene context that the objects belong to. As used herein, the term "relationship" as used between objects in a scene refers to either an expected coexistence of two or more objects within a given scene or a functional relationship between the objects. For example, two appliances (e.g. microwave oven and sink) that coexist within a scene have a relationship, while other objects that are not expected to be located within a single scene, such as the sink and a jig saw, do not have a relationship. Other relationships also include a functional relationship where the sounds emitted by one object often occur in conjunction with sounds emitted by another object, such as a knife and cutting board, where co-occurrences of sound represent an event, such as cooking. The audio monitoring systems described herein expressly do not interpret human speech from humans in the same manner as audio produced by objects, although some embodiments of audio monitoring systems optionally perform conventional processing of human speech in tandem with monitoring of sounds produced by objects in a scene.

As used herein, the term "scene grammar" refers to a statistical model of expected sets of individual recorded sounds that co-occur in a particular scene context. The scene grammar is a graphical data structure that encodes the relationship among various objects based on how they co-occur and co-function together under different scene contexts. In the graphical data structure, each node represents a state of the scene based on the previously identified occurrences of sounds from one or more objects within the scene. Each node in the graph is also assigned a probability that the set of previously identified sounds have occurred. For example, a higher probability indicates that a set of sounds being observed within the scene corresponds to an expected sound event within the scene while a lower probability value indicates that a set of sound events is less common. Edges between different nodes in the graph correspond to different types of sound that are expected to occur in the scene given the current state of the scene represented by each node, and different edges may be weighted based on the expected probabilities of different sounds occurring within the scene conditioned upon the present state of the scene. In some instances, the scene grammar includes some nodes that correspond to different predetermined sound events that are expected to occur within the scene. The audio monitoring system tracks a state of a scene based on actually identified sounds from the scene and identifies that a sound event has occurred if the state of the scene reaches a predetermined node that is associated with the sound event in the scene grammar. In other instances, a sound monitoring system identifies an anomalous event within the scene if two or more recorded sounds place the state of the graph at a node with a probability that is less than a predetermined threshold for expected sounds in the scene. When a scene has been quiet for a predetermined period of time, the scene grammar returns to a quiescent state and the audio monitoring system continues to monitor for additional sounds to identify additional sound events.

A hierarchical scene grammar is a scene grammar that incorporates lower-level scene grammars from two or more scenes. The hierarchical scene grammar can be interpreted as a hierarchy of a tree data structure in which larger scenes act as parent nodes to smaller scenes, which act as children nodes. Under a probabilistic model, the hierarchical scene grammar includes the conditional probability of a child node is non-zero given the parent node (e.g. a particular scene context). Also, given a parent node, the conditional probability of a child node other than its own is zero. An example would be the conditional probability of a microwave oven given bathroom scene context would be zero (or at least highly improbable). Whereas the same would be non-zero when the scene context is kitchen.

The scene grammar model enables an audio monitoring system to identify the occurrence of sound events leveraging the scene context. It also enables identification of higher level scene events from multiple occurrences of sounds corresponding to actions of individual objects in the scene. The audio monitoring system does not use scene grammar model in the actual classification process. Rather, the audio monitoring system uses the scene grammar to segregate audio object classifiers based on particular scene context as well as identify larger sound events based on the individually identified actions of different objects in the scene, relationships between the objects, and temporal relationships such as the sequences and time offsets between individual actions of different objects. As used herein, the term "sound event" refers to a series of identified audio actions performed by one or more objects in a scene that either indicates the occurrence of a predetermined event in the scene grammar statistical model or that deviate from the scene grammar model, which indicates the occurrence of an anomalous event.

Different scene grammars correspond to different types of scenes and in some instances a specific scene grammar corresponds to a distinct set of objects that are present in one scene. For example, one general type of scene grammar includes relationships between actions that are generated by a wide range of objects that are commonly found in a kitchen. Of course, different kitchens in different houses have varying sets of objects. As described in more detail below, an audio monitoring system optionally generates a specific scene grammar based on the objects that are present in a specific scene, such as a particular set of kitchen equipment in one specific kitchen, from a larger general scene grammar that includes relationships between a broader array of objects.

FIG. 1 depicts an audio monitoring system 100. The audio monitoring system 100 includes a processor 128, a memory 132, one or more sound sensors 160, and one or more output devices 164. FIG. 1 also depicts a scene 102 that includes two or more objects 104. FIG. 1 depicts three sound sensors 160 in different locations within the scene 102, although alternative configurations use a single sound sensor or a different number of sound sensors. The sound sensors 160 are, for example, microphones or other transducers that detect sound emitted from the objects 104 in the scene 102 and convert the sound to electrical signals for digitization into digital audio data for further processing in the system 100.

In the audio monitoring system 100, the processor 128 includes analog and digital electronic components that implement analog to digital converters (ADCs), filters, audio digital signal processors, a central processing unit (CPU) with one or more processing cores, and output devices. The output devices optionally include audio and graphical output devices for generating audio-visual output within the scene 102 or data networking devices for communication with other computing devices using wired or wireless data networks. In some embodiments, the processor 128 is embodied using a system-on-a-chip (SoC) that integrates multiple processing components into a single device, while other embodiments include multiple components that are mounted to one or more printed circuit boards (PCBs). The processor 128 operatively connected to the sound sensors 160 to receive audio signals from the sound sensors. The processor 128 is operatively connected to the memory 132 and the output devices 164.

In the system 100, the memory 132 includes both non-volatile data storage devices such as magnetic or solid-state storage devices and volatile storage devices such as random access memory (RAM). The memory 132 stores structured data including files and databases to store program instructions 136, a general scene grammar 140, a specific scene grammar 144, one or more object relationships 148, object action audio profiles 152, and a scene state model 156. The program instructions 136 include one or more executable programs that the processor 128 executes to implement the system training and audio monitoring processes described herein.

The general scene grammar 140 is a statistical model corresponding to a large number of sound events that are expected to occur within a given scene, while the specific scene grammar 144 is a similar statistical model that is customized to only include a portion of the general scene grammar 140 corresponding to objects that are actually present in a specific scene to be monitored. As described below, the general scene grammar 140 is typically generated prior to deployment of the audio monitoring system 100 while the specific scene grammar 144 is generated during a training process after the audio monitoring system 100 has been deployed to monitor a specific scene, such as the scene 102 in FIG. 1.

The object relationship data 148 include predetermined associations between different sets of objects 104 within the scene 102. The object relationship data 148 describe a dependency between two different devices, such as an operational dependency between two different appliances in a kitchen or tools in a workshop. In one configuration, the monitoring system 100 receives object relationship data from a user via the mobile computing device 168 or another suitable user input device. In another configuration, the object relationship data 148 are stored in the memory 132 with the general scene grammar data 140 and remain constant during operation. As described in more detail below, the processor 128 uses the object relationship data 148 in conjunction with the generation of the specific scene grammar 144 since the relationships between objects 104 in the scene 102 affects the expected sequences of recorded sounds from different object actions during operation of the system 100.

The object action audio profiles and classifiers 152 include stored feature data that are extracted from the recorded audio of sounds produced by the objects 104 when performing predetermined actions during a training process. Features refer to characteristics of the audio data corresponding to the sound signal from the object action that can be used to identify a similar sound signal when the object repeats the action in the future. Common examples of audio features include, but are not limited to, mel spectrogram, mel-frequency Cepstral coefficients (MFCC), delta features, chroma, and the like. The classifiers are statistical models that are trained using the recorded feature data to identify if newly recorded audio data from the scene 102 includes a sound that corresponds to the previously recorded feature data from an action of one of the objects 104. During a training operation, the processor 128 uses the recorded feature data to generate parameters and other configuration data to train multiple classifiers for the identification of different object actions. Different examples of classifiers include Gaussian mixture models (GMMs), support vector machines, hidden Markov models, and the like. As described in more detail below, the memory 132 stores multiple classifiers and in some embodiments the processor 128 uses the scene state model 156 and specific scene grammar 144 to select classifiers that have a high probability of matching newly recorded audio data based on previously identified object actions in the scene 102.

The scene state model 156 includes a series of previously identified object actions from the objects 104 in the scene 102. The system 100 updates the scene state model 156 whenever the sound sensors 160 detect a new sound that the system 100 identifies as being produced by a particular object performing a particular action. The scene state model 156 also stores the relationship between identified object actions over time and the processor 128 deletes older actions to maintain the scene state model 156 with the current conditions in the scene 102. As described in more detail below, when the scene state model includes a series of actions that correspond to a sound event in the general scene grammar 140 and specific scene grammar 144, the system 100 generates an output notification that the sound event has been observed. Additionally, in some circumstances the scene state model 156 includes a sequence of recorded object actions that deviate from the scene grammars 140 and 144, in which case the monitoring system 100 generates an output indicating that an unexpected or anomalous sound event is occurring within the scene 102.

In the system 100, the output devices 164 include one or more audio, video, haptic, and network devices that enable the system 100 to provide information about different sound events that occur in the scene 102 to an end user. In different configurations, the end user is a person who occupies the scene 102, such as a resident of a house or a worker in an industrial setting, or a third party who monitors the scene, such as a staff member of a security monitoring firm or a healthcare provider who monitors a patient occupying the scene 102.

In the illustrative embodiment of FIG. 1, the audio monitoring system 100 communicates with a mobile computing device 168. The mobile computing device 168 executes a software application that both receives input from a user during training and operation and displays output messages from the system 100 including monitoring status information about the scene 102 and alert messages if the system 100 identifies the occurrence of an anomalous event that does not correspond to the scene grammar of the scene 102. The mobile device 168 is, for example, a tablet computer, smartphone, wearable computing device or the like. In alternative embodiments a desktop or mobile personal computer (PC) enables user interaction with the audio monitoring system 100.

While FIG. 1 only depicts a single scene 102 for illustrative simplicity, in other embodiments the audio monitoring system 100 monitors two or more scenes simultaneously. In a multi-scene configuration, the system 100 is connected to one or more sound sensors in each monitored scene. In one embodiment, the processor 128, memory 132, and output devices 164 in the system 100 are contained within a single housing that also houses or is connected to the sound sensors 160. In a larger environment, such as a house with multiple rooms that form multiple scenes, one instance of the system 100 is placed within each scene and multiple instances of the system 100 communicate with each other using, for example, a wired or wireless local area network (LAN). In another embodiment, the sound sensors 160 are physically located within the scene 102 to generate recorded audio, but the other components within the audio monitoring system 100 are in a remote location outside of the scene 102. In still other embodiments, the system 100 includes a comparatively simple local processing device in situ with the sound sensors in the scene 102 and a more complex backend system at a remote location. The local processing device receives audio data from the sound sensors 160 and transmits a digital representation of the audio data to the backend system via a data network. The local processing device optionally performs filtering or other simplified digital signal processing operations, while the remote backend system identifies the specific objects and actions that produce the recorded audio data and identifies sound events using the general scene grammar 140 or specific scene grammar 144 for the scene 102. The backend system transmits output messages to the mobile device 168 or other user devices to alert the user of different sound events.

Figure 2:
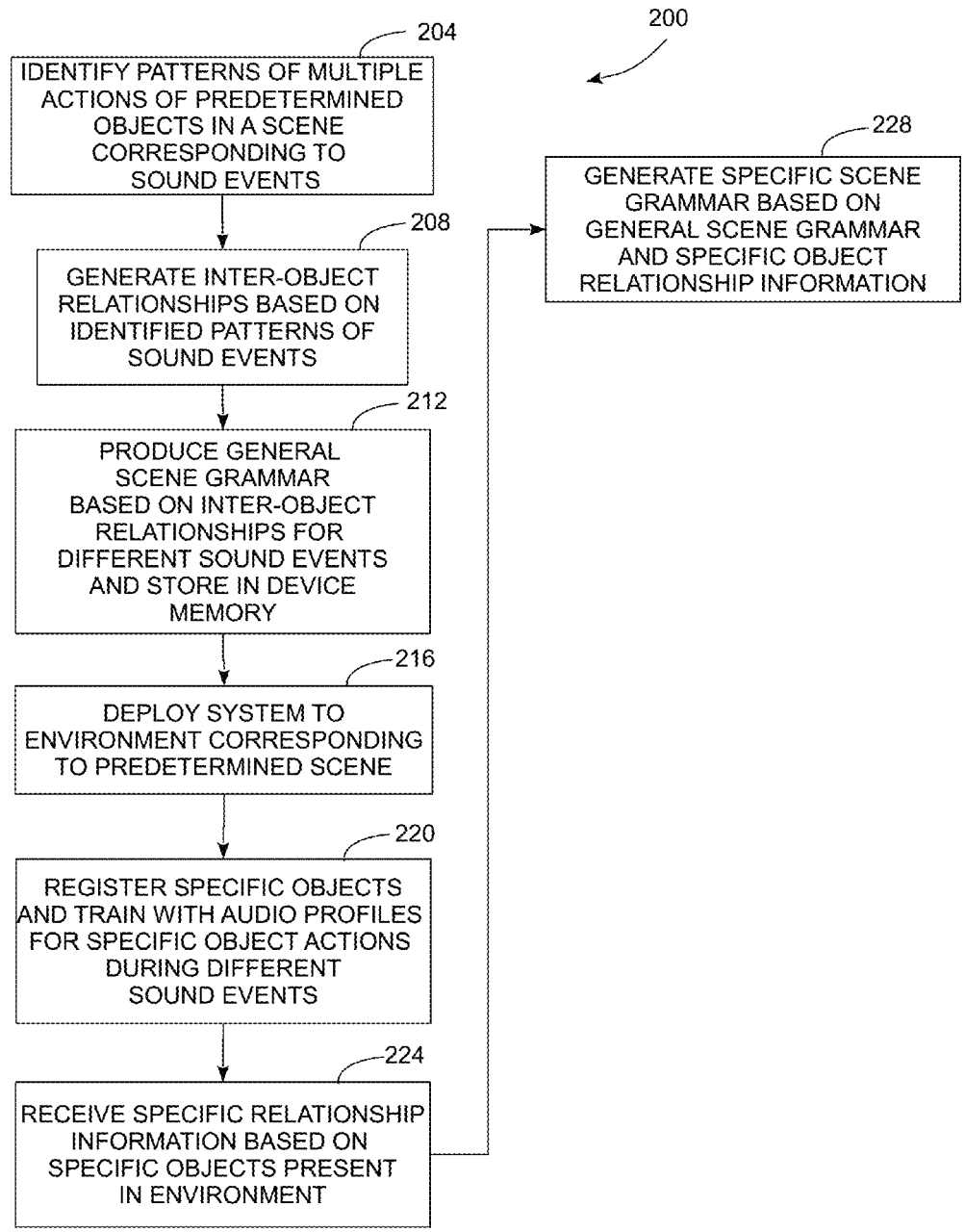
FIG. 2 is a block diagram of a process for training a scene grammar model in the audio monitoring system of FIG. 1.

FIG. 2 depicts a process 200 for the configuration of an audio monitoring system to recognize sound events produced by multiple objects in a scene. In the discussion below, a reference to the process 200 performing an action or function refers to the operation of a processor to execute stored program instructions to perform the function or action in association with other components in an audio monitoring system. FIG. 2 is described in conjunction with the system 100 of FIG. 1 for illustrative purposes.

Process 200 begins as the system 100 identifies patterns of multiple predetermined actions by objects in a scene that correspond to sound events (block 204). For example, in a kitchen scene an observed sequence of object actions during preparation of breakfast includes the operation of the sink, a blender, and a garbage disposal. During the processing of block 204, each action from a particular object is known a priori as part of a training process to generate a general scene grammar. As such, the particular audio signatures for actions performed by a particular type of object are not necessarily required to generate a general scene grammar since a specific scene likely incorporates objects with different specific audio profiles. For example, the precise audio profile of sounds generated by a microwave in a test scene during a training process to generate a general scene grammar likely differ from the audio profiles for another microwave in a different scene when the monitoring system 100 is used in operation. Consequently, the patterns of actions that are identified in the processing of block 204 may be produced via empirical observations of actions that are performed by a comparatively large set of objects in a scene without requiring the system 100 to record and process the precise sets of sound data generated by each object in the scene. In the system 100 an external computing device, such as the mobile computing device 168 or a personal computer (PC) receives user input with definitions of object identities, actions, and time sequences of the actions. The system 100 receives an encoded description of this sequence in a predetermined data format, such as an extensible markup language (XML) format including data identifying the objects, actions, and timing of the actions, such as the sequence of actions in a kitchen during preparation of breakfast described above. During process 200, the system 100 receives a large number of different object action sequences that serve as a corpus to produce a general grammar for a predetermined set of objects in a scene.

Process 200 continues with the generation of inter-object relationships based on the identified patterns of sounds from individual object actions in one or more sound events (block 208). In the system 100, the memory 132 stores the object relationship data 148 to enable the system 100 to produce both general and specific scene grammars. For example, the memory 132 stores coexistence relationships between different objects within each scene that the system 100 monitors to enable the system 100 to identify sounds from objects that are expected to produce sounds within each scene.

Process 200 continues as the system 100 generates a general scene grammar based on the observed sequences of object actions that produce different sound events in the scene and the relationships between objects in the scene (block 212). As described above, the general scene grammar is a statistical model that the system 100 uses to identify a probability that a sequence of recorded sounds from one or more of the objects 104 corresponds to one of the predetermined sound events that are expected to occur in the scene. The system 100 uses the scene grammar as constraint on what could be decoded out of the audio stream/sequence coming out a particular scene context. For example, in a kitchen, a sequence of sound event can be decoded as a combination of microwave, sink, blender and no-activity (i.e. unknown). Say, a sequence of five (5) audio frames is run through the classifiers using the scene grammar then the sequence could be decoded as 4^5=1024 possible sequences based on scene grammar including combinations of the four different recorded sounds. Additionally, sequences of recorded sound actions that significantly deviates from any of the expected sound events in the general scene grammar 140 may indicate the occurrence of an anomalous event within the scene 102. In the system 100, the processor 128 stores the general scene grammar 140 in the memory 132.

The general scene grammar 140 includes relationships between different types of objects, the actions that the objects perform during a larger sound event, and the temporal relationships between actions. Temporal relationships include both an expected order of actions from different objects, and may include other data corresponding to the time duration of an action or if actions from two or more objects overlap in time. Since many actions have varying lengths (e.g. the length of time that water flows from a faucet or that a microwave oven operates), the scene grammar includes tolerances for the actions that may occur over varying lengths of time.

The processing described above regarding blocks 204-212 in the process 200 often occurs prior to deployment of the system 100 to an individual scene. The memory 132 stores the general scene grammar model 140 when the system 100 is initially deployed to an actual environment that corresponds to the predetermined scene (block 216). While the general scene grammar model 140 can be useful in identifying the occurrence of sound events, additional training of the system 100 optionally produces a specific scene grammar 144 that more precisely corresponds to the particular set of objects 104 within a scene 102. Additionally, as described in more detail below, the system 100 is also trained to recognize the particular audio profiles of the specific objects in the scene that correspond to the actions encoded in the general scene grammar 140 and specific scene grammar 144.

Figure 9:
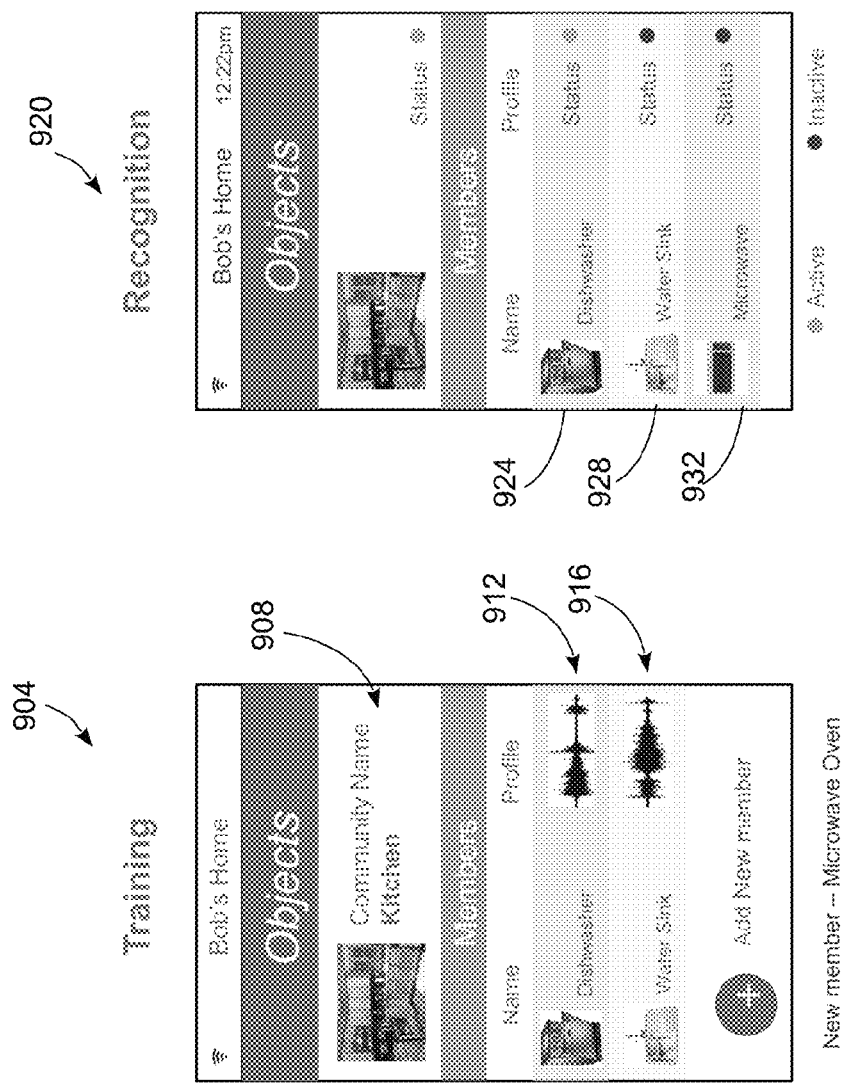
FIG. 9 is a depiction of user interface displays from the audio monitoring system of FIG. 1 during training and monitoring processes.

After the system 100 is deployed to a scene, the system 100 receives inputs to register specific objects that are located within the scene and to train specific audio profiles of different actions that the objects produce (block 220). The general scene grammar 140 for a kitchen may include a wide range of different appliances that are used in different kitchens, while the system 100 may be deployed to a specific kitchen scene that does not include all of the appliances. For example, while the general scene grammar 140 includes sound events that correspond to the operation of a garbage disposal, the system 100 does not include the garbage disposal object or any actions associated with the garbage disposal in a specific scene grammar 144 in a kitchen that does not include the garbage disposal. FIG. 9 depicts an example of a user interface 904 during an object registration and training process that includes an identifier 908 for the scene (kitchen) and object identifiers 912 and 916 corresponding to a dishwasher and sink, respectively. In FIG. 1, the mobile device 168 presents the registration interface to the user, and the user enters registration information for different objects that are present in the scene. Additionally, during the training process the system 100 prompts the user to perform predetermined individual actions with each of the objects. The user performs the predetermined actions, and the system 100 generates audio data profiles based on the recorded sounds from the sound sensors 160.

The processor 128 uses the recorded audio data of predetermined object actions to train one or more classifiers that the system 100 uses to identify the same actions from the objects after the training process is completed. Different examples of classifiers include Gaussian mixture models (GMMs), support vector machines, hidden Markov models, and the like. During the training process, the processor 128 sets specific parameters for different classifiers to improve the accuracy of detection for the audio profiles of different object actions. During later identification of object actions from recorded audio data, the processor 128 selects one or more classifiers that are have a higher probability of corresponding to the action based on a state model of other object actions that have been observed in the scene. As described in more detail below, the system 100 uses the general scene grammar 140 and specific scene grammar 144 to select classifiers that have a higher likelihood of identifying the sounds of the object actions during a monitoring operation.

Figure 3:
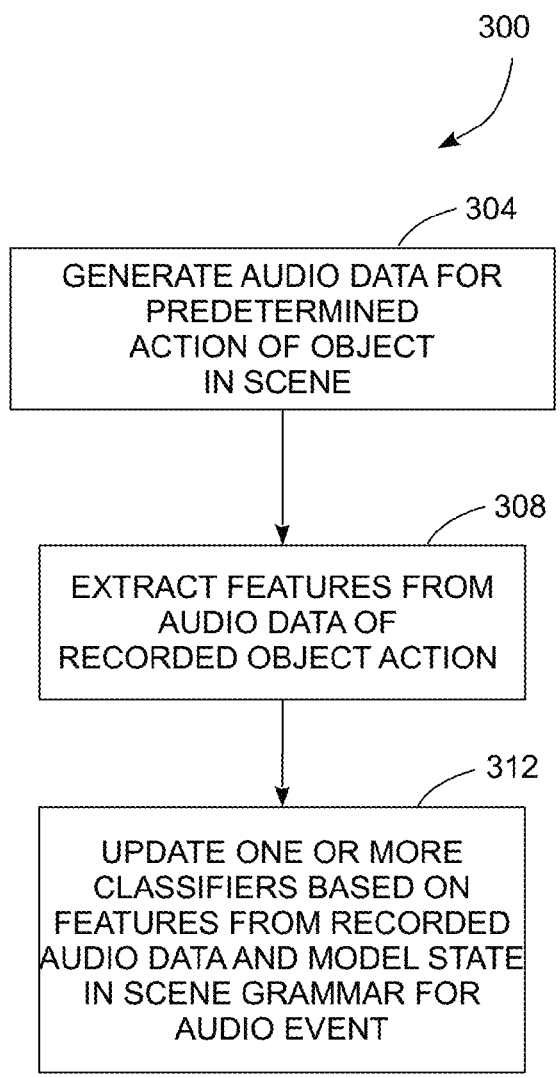
FIG. 3 is a block diagram of a process for generating a classifier during the process of FIG. 2.

FIG. 3 depicts a process 300 for the training process in FIG. 2 in more detail. The process 300 begins as the sound sensors 160 generate audio data of the predetermined action for an identified object in the scene 102 (block 304). The sound sensors in the system 100 are located in situ within the scene 102 and generate audio data from the specific objects 104 in the scene 102. Furthermore, the recordings include variations in the recorded sound that occur due to the acoustic properties of the scene 102 and the relative positioning between the sound sensors 160 and the objects 104. Process 300 continues as the processor 128 extracts features from the audio data of the recorded object action (block 308). Features refer to characteristics of the audio data corresponding to the sound signal from the object action that can be used to identify a similar sound signal when the object repeats the action in the future. Common examples of audio features include, but are not limited to, mel spectrogram, mel-frequency cepstrum (MFCC), delta features, chroma, and the like. In the system 100, the processor 128 generates audio profiles for the action of an object including the features that are extracted from the audio data of one or more occurrences of the action. The processor 128 uses the extracted features as a basis to train a classifier, such as the GMM or support vector machine described above (block 312). The classifier can be trained using multiple sets of data corresponding to the same object action to improve the accuracy of identifying features in the sound signal from the action that occur repeatedly when the object performs the action. In the system 100, the processor 128 stores the object action audio profiles and classifiers 152 in the memory 132. As described in more detail below, the system 100 uses the specific scene grammar 144 to select specific classifiers that have the highest probability of matching audio data recorded from different objects 104 in the scene 102 to improve the accuracy of identifying sound events in the scene 102.

Figure 10:
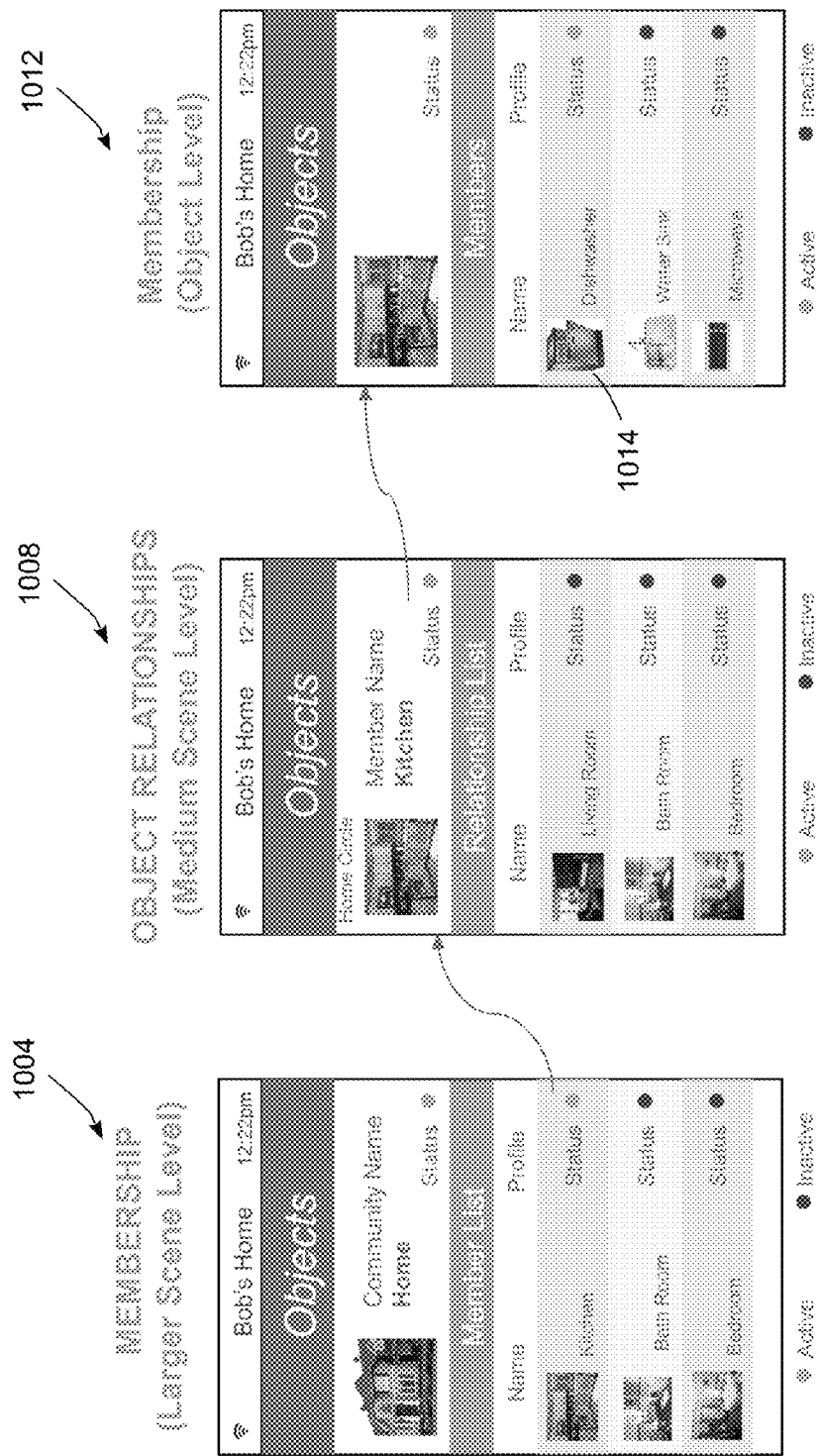
FIG. 10 is a depiction of user interface displays to register relationships between scenes and objects within scenes in the audio monitoring system of FIG. 1.
Figure 10:
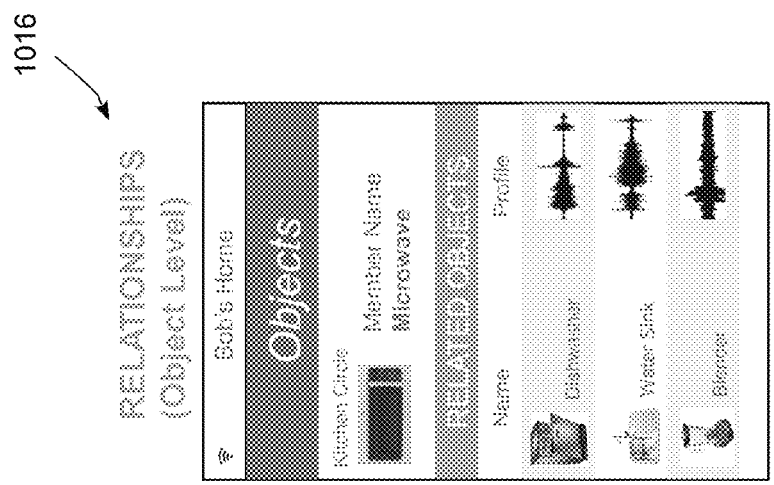

Referring again to FIG. 2, the process 200 continues as the system 100 receives specific relationship information based on the specific sets of objects that are present in the scene (block 224). For example, FIG. 10 depicts a set of user interface displays that depict the relationships between objects in a specific scene hierarchy and enable a user to establish relationships between objects. The display 1004 depicts membership relationships of smaller scenes within a larger scene (e.g. a kitchen is a member of a house). The display 1008 includes membership relationships between objects that are registered to a particular scene, such as appliances in the kitchens. The display 1012 depicts the status of objects in the scene, with the display 1012 depicting the dishwasher as being activated in the example of FIG.

10. The display 1016 depicts inter-object relationships within the scene. For example, the display 1016 depicts coexistence relationships between the microwave and other objects that the system 100 has registered to be present within the kitchen scene such as the dishwasher, sink, and blender. In the system 100, the mobile device 168 generates the object relationship interfaces depicted in FIG. 10 and transmits object relationship data to the system 100 during the process 200 to assist in generating a specific scene grammar. During process 200, the mobile device 168 or other suitable user input device receives a relationship identifier from the user that two or more objects have a relationship within the scene. In one configuration, the relationship identifier indicates that the objects have a coexistence relationship, meaning that all of the objects are present within a single scene and that the monitoring system records various sounds from the objects. The specific scene grammar is generated without a requirement for a specific temporal order corresponding to the sequence of sounds from the individual objects if the objects are only related by coexistence within a scene. In another configuration, the relationship identifier specifies a functional relationship between two or more objects. For example, the motor and bit of a woodworking tool in a shop produces a first sound profile and a related shop vacuum that removes excess wood from the woodworking tool produces a second sound profile that occurs after operation of the woodworking tool. The functional relationship identifier specifies the types of sounds that two or more functionally related objects produce, and optionally includes temporal information to specify a temporal order for sounds from the related objects or to specify that the related objects produce sounds simultaneously.

Referring again to FIG. 2, the process 200 continues as the processor 128 generates a specific scene grammar 144 and stores the specific scene grammar 144 in the memory 132 (block 228). In one embodiment, the processor 128 generates the specific scene grammar 144 as a subset of the general scene grammar 140 using only the objects 104 and specific object actions that are registered with the system 100 during the training process. The system 100 generates the specific scene grammar 144 to customize audio monitoring operations in the scene 102 to monitor and identify only the sound events generated by the objects 104 that are actually present in the scene 102 and to ignore other sound events that are present in the larger general scene grammar 140 but that would not occur in the specific scene 102. In another embodiment, the system 100 extends the specific scene grammar 144 to include at least one sound event that is not present in the general scene grammar 140. During the training process, the user optionally enters registration information for a set of sounds that are generated by different objects in the scene using the mobile device 168 to update the specific scene grammar 144 with a sound event that is not present in the general scene grammar 140. For example, the registration information includes an identifier for the objects that emit the sounds, a label for the sounds that each object emits, and the system 100 records the sounds to generate audio profiles and classifiers 152 for the newly registered sound event. The specific scene grammar 144 receives the update for scenes that may include unusual combinations of objects that were not included in the general scene grammar 140. The specific scene grammar 144 also associates different classifiers for various sound actions with the probability model to enable the system 100 to apply different classifiers to different individual sound actions.

Figure 6:
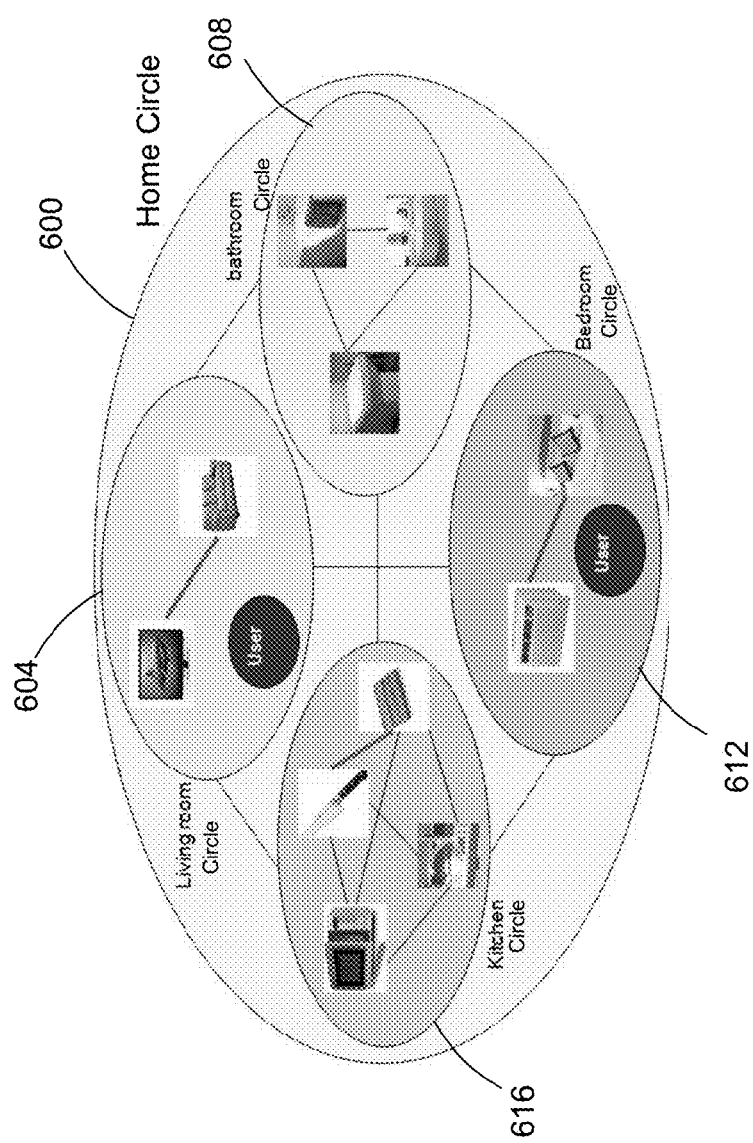
FIG. 6 is a diagram of a scene hierarchy.
Figure 7:
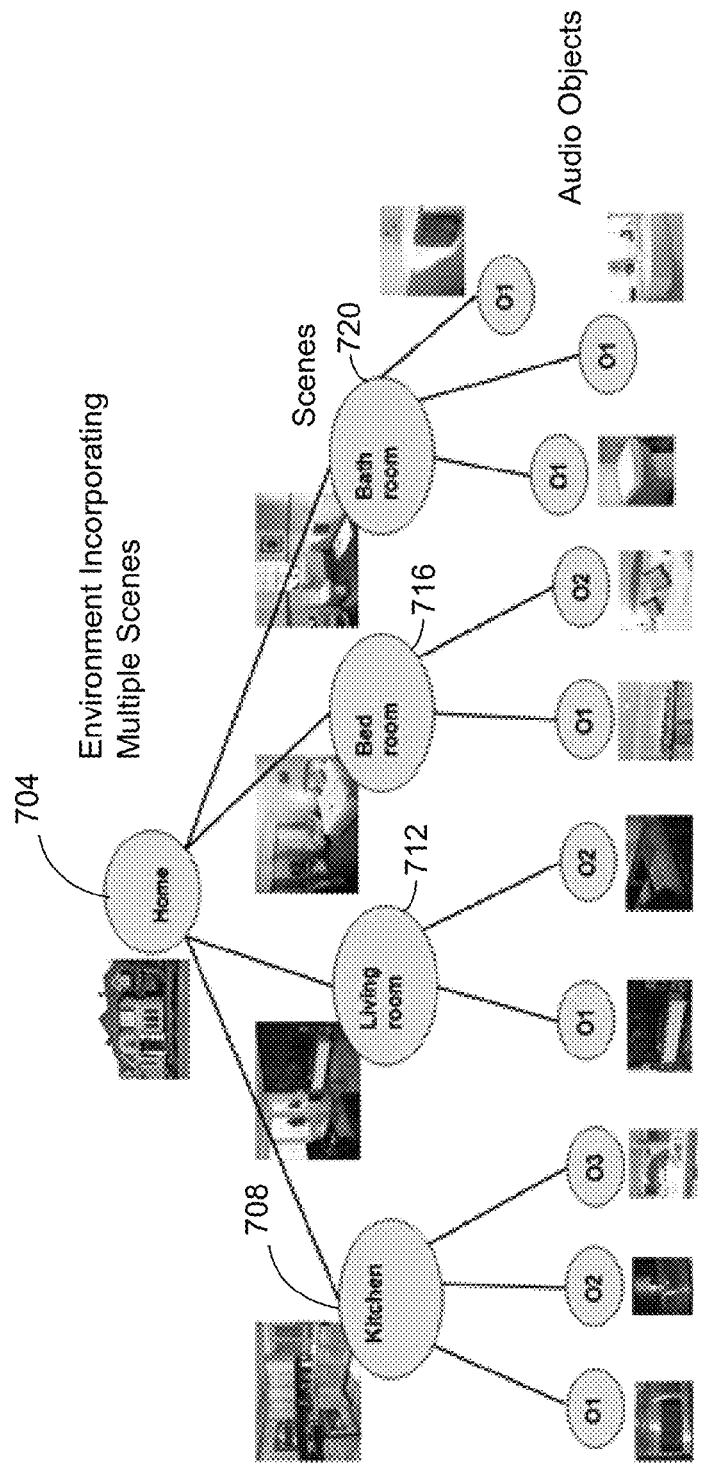
FIG. 7 is another diagram of a scene hierarchy.

The system 100 optionally performs the process 200 for multiple scenes within a larger hierarchy, such as multiple rooms within a house. The memory 132 stores different sets of audio profile and classifier data 152 for each scene and a specific scene grammar 144 for each scene. Additionally, a scene hierarchy optionally stores relationships between smaller sub-scenes that form larger sound events using different sound events that occur in the individual sub-scenes. For example, the processor 128 stores the specific scene grammar data 144 with a hierarchy of scene grammars for the hierarchical scene grammar in the memory 132 with a relationship between the specific scene grammar of a first scene and the specific scene grammar of a second scene for identification of another sound event corresponding to sounds from object actions that occur in both the first scene and the second scene. FIG. 6 depicts one example of a hierarchy with a larger "home circle" 600 corresponding to a single home that further includes a living room scene 604, bathroom scene 608, bedroom scene 612, and kitchen scene 616. Each of the scenes further includes two or more objects that perform actions and generate sounds recorded by the monitoring system 100. FIG. 7 depicts another example of a similar hierarchy 700 including the house 704, kitchen 708, living room 712, bedroom 716, and bathroom 720.

Figure 4:
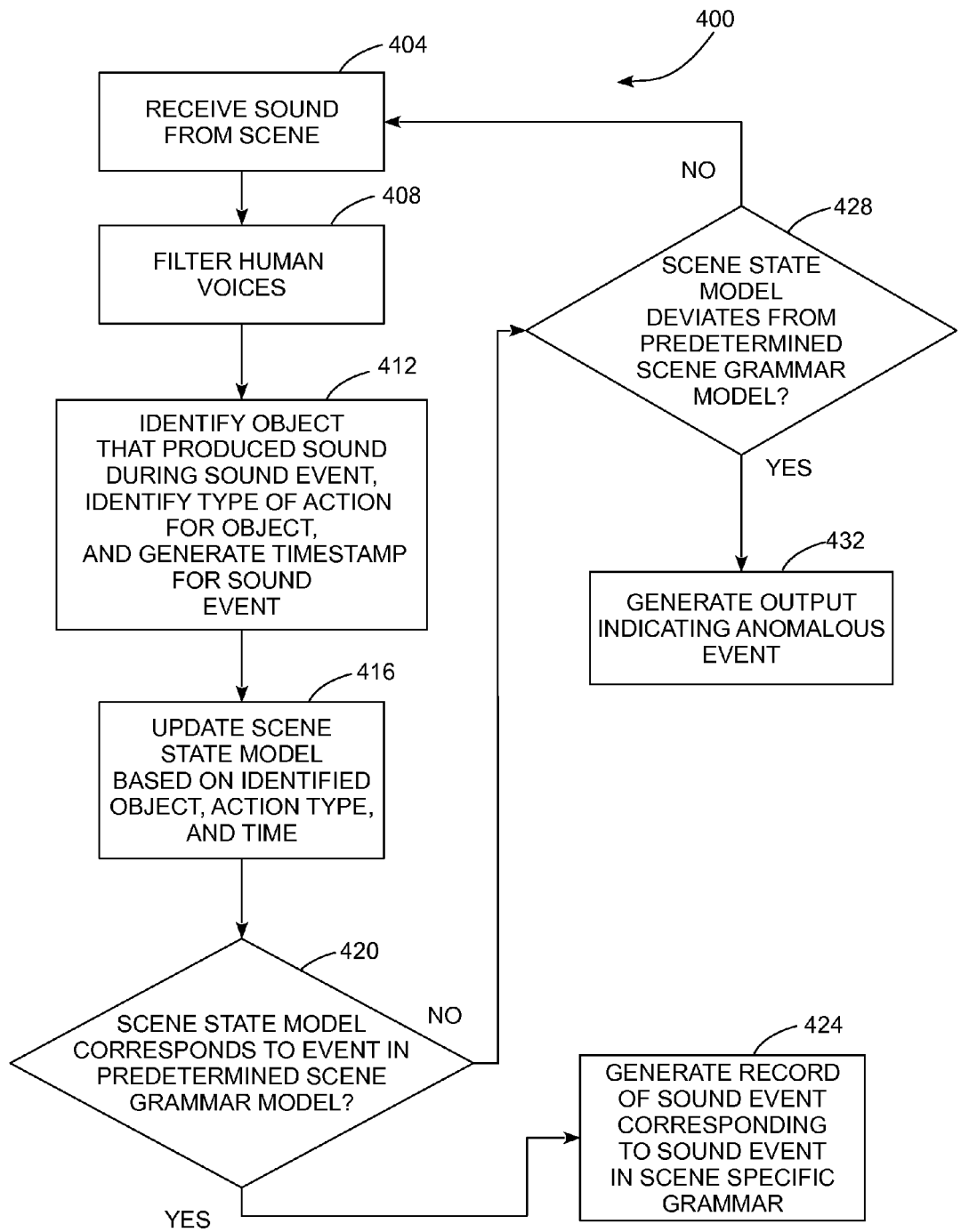
FIG. 4 is a block diagram of a process for performing audio monitoring of a scene using the system of FIG. 1.

FIG. 4 depicts a process 400 for operation of an audio monitoring system to identify sound events based on the actions of objects within a scene. In the discussion below, a reference to the process 200 performing an action or function refers to the operation of a processor to execute stored program instructions to perform the function or action in association with other components in an audio monitoring system. FIG. 2 is described in conjunction with the system 100 of FIG. 1 for illustrative purposes. In the illustrative example of FIG. 1, the system 100 performs the monitoring process 400 of FIG. 4 after generating a specific scene grammar 144 and the audio profile and classifier data 152 corresponding to specific objects 104 within the scene 102.

Process 400 begins as the system 100 receives sound from the scene (block 404) and performs a filtering process to ignore human voices in order to only process sounds generated by objects within the scene (block 408). In the system 100, one or more of the sound sensors 160 detect sound from the scene 102 and the processor 128 receives the audio data from the sensors 160 that are digitized for further processing. In some instances the sound is detected in a close proximity in time to other sounds from the scene 102 and the system 100 has a stored scene state model 156 corresponding to the previously detected sounds, while in other instances if the scene has been quiet for a sufficient time period the received sound is potentially the first sound that is detected in a new sound event within the scene 102. The filtering of human voices includes, for example, includes a band-pass filter that filters human voice signals with a large proportion of energy in a frequency range of 85 Hz to 300 Hz, although any other suitable hardware and software implementations to detect and filter human voices may be used in different embodiments. The filtering process optionally includes filtering based on the energy level of the audio signal to filter out both quiet noises that are below a predetermined energy threshold and loud noises that go above the expected energy levels of the predetermined objects 104 in the scene 102. In some embodiments, the system 100 optionally implements human speech recognition in tandem with the process 400 or transmits audio data of human voices to a separate system that performs speech recognition, but these processes are not described in further detail herein.

Process 400 continues as the system 100 identifies the object 104 in the scene 102 that generated the sound, the action that the object performed, and a timestamp to identify the time at which the sound occurred (block 412). The processor 128 uses at least one of the classifiers 152 to identify the object and action that produced the sound. The processor 128 applies selected classifiers 152 the extracted feature data from the audio to identify both the type of object that produced the sound and the nature of the action that the object performed to produce the sound. The classifiers 152 generate statistical confidence scores that correspond to a confidence probability that the audio data corresponds to the object and action sound associated with each classifier. In some instances, multiple classifiers generate results for a potential match to a particular sound and the processor 128 accepts the result of the classifier with the greatest confidence score indicating that the selected classifier has the most likely match for the object type and object action. In particular, if the system 100 has not received previous sound events to update the scene state model 156, then the processor 128 uses multiple classifiers for objects 104 in the scene 102 and selects a best match for the recorded audio data.

Figure 5:
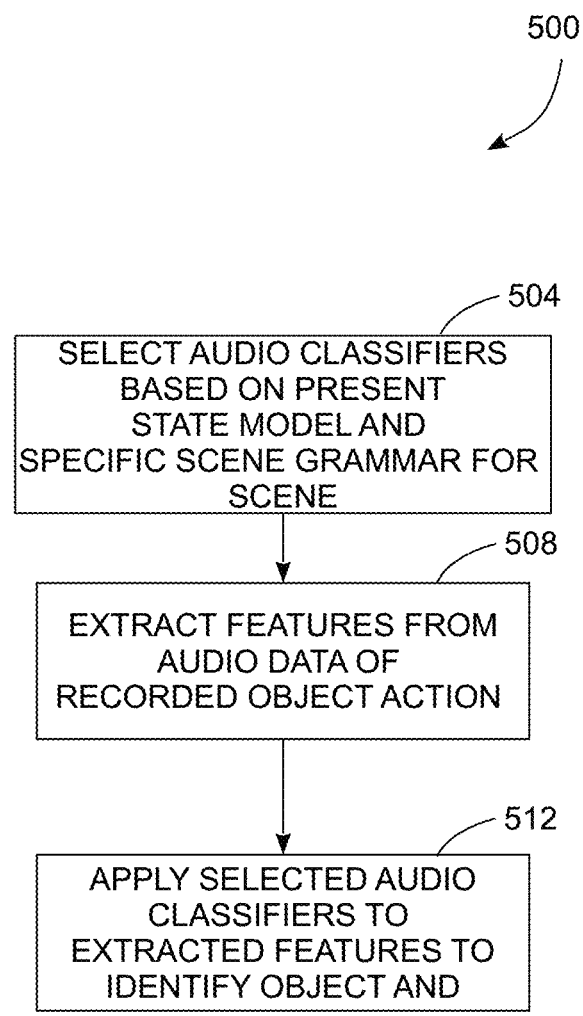
FIG. 5 is a block diagram of a process for selecting a classifier to use for classification of recorded audio data during the audio monitoring process of FIG. 4.

In other instances, the processor 128 uses the present state of the scene state model 156 and the specific scene grammar 144 to identify an object and action that has the highest probability of occurring based on the current state of the scene 102. FIG. 5 depicts a process 500 for selecting classifiers based on the present state model. The process 500 begins as the processor 128 uses the present state model data 156 to select one or more classifiers 152 that have a high likelihood of matching the recorded audio data based on specific scene grammar 144 (block 504). For example, if the scene state model 156 indicates that a microwave was activated at relative timestamp 00:00 and the additional sound is detected at timestamp 00:30, then the processor 128 identifies an object and action (e.g. that the sink runs water) that has a highest likelihood of occurring after activation of the microwave with reference to the specific scene grammar 144. The processor 128 extracts features from the recorded audio data (block 508) and applies the selected classifiers 152 to identify if the sound corresponds to the most likely object action or if the sound corresponds to a different object action where another classifier could match the sound more accurately (block 512).

Referring again to FIG. 4, the process 400 continues as the processor 128 updates the scene state model 156 based on the identified object, type of action, and timestamp for the detected sound (block 416). As described above, the processor 128 updates the scene state model 156 based on the relative times that different objects 104 perform actions in the scene 102. In some embodiments, the processor 128 uses a sliding time window with a predetermined length corresponding to the largest expected amount of time for any identifiable event to occur in the scene to update the scene state model 156. For example, if the longest sound event that is expected to occur in the scene takes 10 minutes, then the processor 128 updates the scene state model 156 to "age out" or remove identified actions that occurred more than 10 minutes prior to the present time. In other embodiments, the processor 128 deletes older identified object actions after a predetermined period of not receiving any new sounds (e.g. 2 minutes of silence).

After updating the scene state model, the system 100 identifies if a sound event that is stored in the specific scene grammar 144 has occurred, if another anomalous event that deviates from any of the events encoded in the specific scene grammar 144 has occurred, or if additional audio information is required to identify the occurrence of any sound event.

If the updated scene state model corresponds to one of the sound events in the specific scene grammar (block 420), then the system 100 generates a record of the sound event that corresponds to the predetermined event in the specific scene grammar 144 (block 424). In some configurations, the processor 128 generates a graphical display or transmits a message over a data network using the output devices 164 to inform an end user that the sound event has been recorded. In one configuration, the mobile device 168 generates a status update including both a record of sound events that have occurred in the scene and a status indicating the operational state of one or more objects in the scene. FIG. 9 depicts an output display 920 that includes indicators for the dishwasher 924, sink 928, and microwave 932. In the display 920, the monitoring system generates an "active" status for the dishwasher 924 in response to detecting sounds corresponding to the operation of the dishwasher 924, while the sink 928 and microwave 934 are "inactive" when the monitoring system 100 receives no sounds from these objects. A remote monitoring service such as a security or telehealth service may record logs of "normal" sound events that are part of the specific scene grammar 144 and are recorded by the audio monitoring system 100. In some instances, the external monitoring service identifies if expected sound events do not occur, such as when a homeowner leaves the house for a vacation or if a telehealth patient is feeling ill and does not perform an expected pattern of activities.

Figure 8:
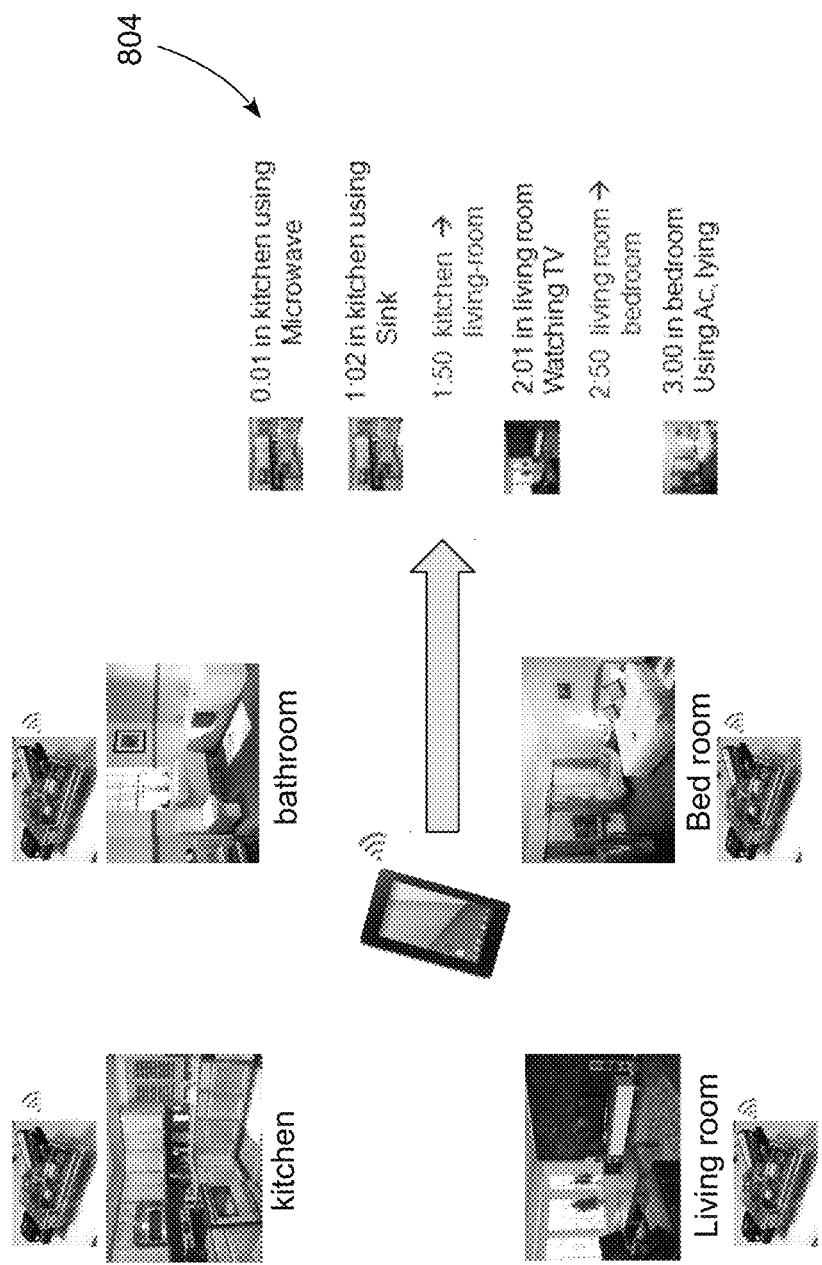
FIG. 8 is a diagram depicting an example of output from the audio monitoring system 100 when monitoring actions that occur in different scenes within a house.

In some configurations, the system 100 identifies events and other monitoring information about the larger scene from specific information about the operations of objects in the smaller sub-scenes. For example, in one configuration the system 100 identifies that nobody is occupying a house in response to an absence of any object activity from the sub-scenes that correspond to individual rooms within the house. In another configuration, the system 100 monitors the occupancy of different rooms within a house at different times based on the sound events that occur within each room. FIG. 8 depicts a sequence of sound events 804 that correspond to the actions of different objects in different rooms of a house to track the movement of an occupant in the house. The kitchen, living room, and bedroom are three different scenes that each has a specific scene grammar within the hierarchical scene grammar for a house. Two or more individual sound events occurring within individual scenes can correspond to a larger sound event at a higher level in the scene hierarchy. For example, at timestamp 0:01 the microwave is activated and at timestamp 1:02 the sink is activated to indicate activity within the kitchen. The event sequence 804 includes activity within the living room and then bedroom at later times, which indicates a sequence of activity by the occupant of the house. Thus, in one configuration, the audio monitoring system 100 identifies a larger sound event, such as a sound event corresponding to ordinary evening activities within the higher-level "house" scene, based on the individual sound events that are identified in the specific scene grammars for the different rooms in the house.

If the updated scene state model 156 does not correspond to a sound event in the specific scene grammar (block 420), then the processor 128 identifies if the scene state model significantly deviates from the specific scene grammar (block 428). For example, if the specific scene grammar for one sound event further includes a series of three object actions, then the scene state model that has recorded the sounds of only one or two of the three object actions has not yet reached a state where the sound event has occurred in the specific scene grammar 144, but the present scene state model does not deviate significantly from the specific scene grammar 144 either. The process 400 returns to the processing of block 404 for the system 100 to receive additional sounds from the objects 104 in the scene 102 if the scene state model 156 does not deviate significantly from the specific scene grammar 144. If, however, the system 100 identifies that the recorded object actions in the scene state model 156 deviate significantly from any of the sound events that are stored in the specific scene grammar 144 (block 428), then the processor 128 uses the output devices 164 to generate another output indicating that an anomalous event has been detected (block 432). For example, each audio concept classifier outputs a likelihood probability at the time of recognition. If, for a certain audio segment, the likelihood is very low for all allowed scene grammar components in the scene and the event is of acoustic significance (loud enough) that enables the system to identify that a significant event that is not present in the scene grammar has occurred, then the system 100 identifies an anomalous event. In one embodiment, the system 100 generates a visible or audible alarm to alert users within the scene 102 to the detection of an anomaly, such as a potential malfunction of one of the objects 104 in the scene 102. In another embodiment, the system 100 transmits a message to a remote monitoring service to alert the monitoring service to the anomalous event. The message optionally includes the specifically identified object actions and timestamps that form the anomalous event and a copy of the audio data for one or more sounds that were recorded during the anomalous event to alert the monitoring service to the objects 104 in the scene 102 that exhibit the anomalous behavior.

The audio monitoring system 100 enables effective monitoring of one or more scenes with minimal intrusiveness to the occupants of the scenes. The system 100 enables monitoring of different events without requiring full video recording of the scenes, and filters human voices to preserve the privacy of conversations within each scene. It will be appreciated that variants of the above-disclosed and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed:

1. A method of training an audio monitoring system comprising:
   receiving with a processor in the audio monitoring system first registration information for a first object in a first scene around a sound sensor in the audio monitoring system;
   training with the processor a first classifier for a first predetermined action of the first object in the first scene, the first predetermined action generating sound detected by the sound sensor;
   receiving with the processor second registration information for a second object in the first scene around the sound sensor;
   training with the processor a second classifier for a second predetermined action of the second object in the first scene, the second predetermined action generating sound detected by the sound sensor;
   receiving with the processor object relationship data corresponding to a relationship between the first object and the second object in the first scene;
   generating with the processor a specific scene grammar including a first sound event formed from with reference to a predetermined general scene grammar stored in a memory, the first registration information, the second registration information, and the object relationship data; and
   storing with the processor the specific scene grammar in the memory in association with the first classifier and the second classifier for identification of a subsequent occurrence of the first sound event including the first predetermined action of the first object and the second predetermined action of the second object.

2. The method of claim 1, the training of the first classifier further comprising:
   generating with a sound sensor in the audio monitoring system first audio data corresponding to a first predetermined action of the first object;
   extracting with the processor a first plurality of features from the first audio data;
   generating with the processor a first classifier corresponding to the predetermined sound event from the first object with reference to the first plurality of features; and
   storing with the processor the first classifier in the memory on association with the first predetermined action of the first object and the specific scene grammar.

3. The method of claim 2, the extracting of the first plurality of features further comprising:
   extracting with the processor at least one of a mel spectrogram, mel-frequency cepstrum (MFCC), delta, and chroma feature from the audio data.

4. The method of claim 1 further comprising:
   receiving with the processor a relationship identifier indicating presence of the first object and the second object within the first scene; and
   generating with the processor the specific scene grammar including the first sound event with reference to the first predetermined action and the second predetermined action.

5. The method of claim 1, the receiving of the object relationship data further comprising:
   receiving with the processor a relationship identifier indicating a functional relationship including data specifying a temporal order of the first predetermined action and the second predetermined action; and
   generating with the processor the specific scene grammar including the first sound event with reference to the temporal order between the first predetermined action and the second predetermined action.

6. The method of claim 1, the generation of the specific scene grammar further comprising:
   retrieving with the processor a predetermined general scene grammar from the memory, the predetermined general scene grammar including a plurality of sound events corresponding to actions performed by a plurality of objects;
   identifying with the processor one sound event in the plurality of sound events in the predetermined general scene grammar including objects corresponding to the first object and the second object with reference to the first registration information and the second registration information; and generating with the processor the specific scene grammar including the one event identified in the predetermined general scene grammar.

7. The method of claim 1 further comprising:
generating with the processor a hierarchical scene grammar including the specific scene grammar corresponding to the first scene and at least one other specific scene grammar corresponding to a second scene; and
storing with the processor the hierarchical scene grammar in the memory with a relationship between the specific scene grammar of the first scene and the specific scene grammar of the second scene for identification of another sound event corresponding to sounds from object actions that occur in both the first scene and the second scene.

8. A method of operating an audio monitoring system comprising:
generating with a sound sensor audio data corresponding to sound produced by an action performed by an object in a first scene around the sound sensor;
identifying with a processor a type of object in the first scene that generated the sound with reference to the audio data;
identifying with the processor the action taken by the object to generate a sound event with reference to the audio data;
generating with the processor a timestamp corresponding to a time of the detection of the sound;
updating with the processor a scene state model corresponding to a plurality of sound events generated by a plurality of objects in the first scene around the sound sensor with reference to the identified type of object, action taken by the object, and the timestamp;
identifying with the processor one sound event in the plurality of sound events for the first scene with reference to the first scene state model and a predetermined scene grammar stored in a memory; and
generating with the processor an output corresponding to the one sound event.

9. The method of claim 8 further comprising:
filtering with the processor audio data corresponding to a human voice from the audio data received from the sound sensor prior to identification of the type of object in the first scene that generated the sound.

10. The method of claim 8, the identification of the type of object and action taken by the object further comprising:
selecting with the processor at least one classifier from a plurality of classifiers stored in the memory, the first classifier being selected with reference to the first scene state model for the first scene prior to updating the first scene state model and the predetermined scene grammar to select the at least one classifier corresponding to an expected object action for the one sound event in the predetermined scene grammar; and
applying with the processor the at least one classifier to identify the type of object and the action taken by the object based on a result from the at least one classifier that produces a highest confidence score.

11. The method of claim 8 further comprising:
identifying with the processor that the first scene state model does not correspond to any sound event in the plurality of sound events in the first scene grammar; and
generating with the processor an output indicating an anomaly in the first scene.

12. The method of claim 11, the generation of the output further comprising:
transmitting with the processor a message including the identified type of object, action taken by the object, timestamp, and a copy of the audio data to a monitoring service.

13. An audio monitoring system comprising:
a sound sensor configured to generate audio data corresponding to sound produced by an action performed by an object in a first scene around the sound sensor;
an output device; and
a processor operatively connected to the sound sensor, the output device, and a memory, the processor being configured to:
identifying a type of object in the first scene that generated the sound with reference to the audio data;
identify the action taken by the object to generate a sound event with reference to the audio data;
generate a timestamp corresponding to a time of the detection of the sound;
update a scene state model corresponding to a plurality of sound events generated by a plurality of objects in the first scene around the sound sensor with reference to the identified type of object, action taken by the object, and the timestamp;
identify one sound event in the plurality of sound events for the first scene with reference to the first scene state model and a predetermined scene grammar stored in the memory; and
generate an output corresponding to the one sound event.

14. The system of claim 13, the processor being further configured to:
filter audio data corresponding to a human voice from the audio data received from the sound sensor prior to identification of the type of object in the first scene that generated the sound.

15. The system of claim 13, the processor being further configured to:
select at least one classifier from a plurality of classifiers stored in the memory, the first classifier being selected with reference to the first scene state model for the first scene prior to updating the first scene state model and the predetermined scene grammar to select the at least one classifier corresponding to an expected object action for the one sound event in the predetermined scene grammar; and
apply the at least one classifier to identify the type of object and the action taken by the object based on a result from the at least one classifier that produces a highest confidence score.

16. The system of claim 13, the processor being further configured to:
identify that the first scene state model does not correspond to any sound event in the plurality of sound events in the first scene grammar; and
generate an output indicating an anomaly in the first scene.

17. The system of claim 16, the processor being further configured to:
transmit a message including the identified type of object, action taken by the object, timestamp, and a copy of the audio data to a monitoring service.

18. The system of claim 13, the processor being further configured to:
receive first registration information for a first object in the first scene around the sound sensor;
train a first classifier for a first predetermined action of the first object in the first scene, the first predetermined action generating sound detected by the sound sensor;

receive second registration information for a second object in the first scene around the sound sensor;

train a second classifier for a second predetermined action of the second object in the first scene, the second predetermined action generating sound detected by the sound sensor;

receive object relationship data corresponding to a relationship between the first object and the second object in the first scene;

generate the predetermined scene grammar including a first sound event formed from with reference to a predetermined general scene grammar stored in the memory, the first registration information, the second registration information, and the object relationship data; and store the predetermined scene grammar in the memory in association with the first classifier and the second classifier for identification of a subsequent occurrence of the first sound event including the first predetermined action of the first object and the second predetermined action of the second object.

19. The system of claim 18, the processor being further configured to:

receive first audio data corresponding to a first predetermined action of the first object from the sound sensor;

extract a first plurality of features from the first audio data;

generate a first classifier corresponding to the predetermined sound event from the first object with reference to the first plurality of features; and store the first classifier in the memory on association with the first predetermined action of the first object and the predetermined scene grammar.

20. The system of claim 18, the processor being further configured to:

retrieve a predetermined general scene grammar from the memory, the predetermined general scene grammar including a plurality of sound events corresponding to actions performed by a plurality of objects;

identify one sound event in the plurality of sound events in the predetermined general scene grammar including objects corresponding to the first object and the second object with reference to the first registration information and the second registration information; and generate the predetermined scene grammar including the one event identified in the predetermined general scene grammar.

* * * * *